(12) United States Patent
Kuznetsov et al.

(10) Patent No.: US 10,908,303 B1
(45) Date of Patent: Feb. 2, 2021

(54) NEUTRON SPECTROMETER

(71) Applicants: Evgeny N. Kuznetsov, Huntsville, AL (US); Jeffrey A. Apple, Huntsville, AL (US); Brian F. Gibson, Huntsville, AL (US); John W. Watts, Huntsville, AL (US); Mark Joseph Christl, Huntsville, AL (US)

(72) Inventors: Evgeny N. Kuznetsov, Huntsville, AL (US); Jeffrey A. Apple, Huntsville, AL (US); Brian F. Gibson, Huntsville, AL (US); John W. Watts, Huntsville, AL (US); Mark Joseph Christl, Huntsville, AL (US)

(73) Assignees: Board of Trustees of the University of Alabama, for and on behalf of the University of Alabama in Huntsville, Huntsville, AL (US); NASA, Washington, DC (US)

( * ) Notice: Subject to any disclaimer, the term of this patent is extended or adjusted under 35 U.S.C. 154(b) by 0 days.

(21) Appl. No.: 16/038,767

(22) Filed: Jul. 18, 2018

(51) Int. Cl.
 *G01T 3/06* (2006.01)
 *G01T 3/00* (2006.01)

(52) U.S. Cl.
 CPC .............. *G01T 3/065* (2013.01); *G01T 3/003* (2013.01)

(58) Field of Classification Search
 CPC ................................ G01T 3/065; G01T 3/003
 USPC ..................................................... 250/390.11
 See application file for complete search history.

(56) References Cited

U.S. PATENT DOCUMENTS

| 6,714,616 | B1 | 3/2004 | Kronenberg et al. |
| 7,141,799 | B1* | 11/2006 | Neal ........................ G01T 1/167 |
| | | | 250/390.11 |
| 8,653,470 | B2 | 2/2014 | Dubeau |
| 8,658,983 | B2 | 2/2014 | Achtzehn et al. |
| 9,268,044 | B2 | 2/2016 | Ramsden et al. |
| 9,316,753 | B2 | 4/2016 | Slaughter et al. |
| 2003/0001099 | A1* | 1/2003 | Coles ..................... G01T 1/1642 |
| | | | 250/369 |
| 2003/0013950 | A1* | 1/2003 | Rollo ..................... G01T 1/1647 |
| | | | 600/407 |
| 2006/0054863 | A1* | 3/2006 | Dai ......................... B82Y 10/00 |
| | | | 252/301.4 R |

(Continued)

OTHER PUBLICATIONS

Mark Joseph Christl, "Fast Neutron Spectrometer (FNS)," NASA, www.nasa.gov/mission_pages/station/research/experiments/2103.html, Jun. 28, 2017, p. 1-3.

*Primary Examiner* — David P Porta
*Assistant Examiner* — Gisselle M Gutierrez
(74) *Attorney, Agent, or Firm* — Maynard Cooper & Gale, P. C.; Jon E. Holland

(57) ABSTRACT

A neutron spectrometer is provided to distinguish neutron capture events from other types of radiation in order to measure the energy associated with neutrons in a mixed radiation environment. The neutron spectrometer can include a neutron detector to capture neutrons and a controller to determine the energy associated with the captured neutrons. The neutron detector can include scintillating glass fibers embedded in a plastic scintillator. A photomultiplier tube can be positioned on each end of the detector to detect light pulses generated by both the scintillating glass fibers and the plastic scintillator. A controller can analyze the detected light pulses to determine when a neutron is captured and the energy associated with the neutron capture event.

18 Claims, 5 Drawing Sheets

(56) References Cited

U.S. PATENT DOCUMENTS

| | | | |
|---|---|---|---|
| 2007/0069146 A1* | 3/2007 | Neal | G01T 1/167 250/390.11 |
| 2009/0236533 A1* | 9/2009 | Ramsden | G01T 1/2002 250/370.11 |
| 2012/0317791 A1* | 12/2012 | Frank | G01T 3/00 29/592.1 |
| 2014/0151567 A1* | 6/2014 | Slaughter | G01T 3/001 250/367 |
| 2015/0076360 A1* | 3/2015 | Menge | G01T 3/06 250/390.11 |
| 2016/0266264 A1* | 9/2016 | Slaughter | G01T 3/001 |
| 2018/0074222 A1* | 3/2018 | Pitts, Jr. | G01V 5/102 |
| 2019/0025446 A1* | 1/2019 | Barzilov | G01T 3/06 |

* cited by examiner

NEUTRON SPECTROMETER

STATEMENT REGARDING FEDERALLY SPONSORED RESEARCH OR DEVELOPMENT

This invention was made with government support under Contract Number NNM11AA01A awarded by NASA. The government has certain rights in the invention.

BACKGROUND

The present application relates to a neutron spectrometer for measuring the energy of neutrons.

Exposure to neutron radiation can be hazardous to a person. One source of neutron radiation can occur from the flux of high energy particles in cosmic rays that interact with spacecraft, habitats or planetary surfaces. On Earth, the particle interactions occur primarily at high altitudes, so the flux of neutrons is well separated from the population. However, for astronauts engaging in space travel and exploration, the risk of exposure to neutron radiation is increased since Earth's atmosphere no longer provides any protection and the astronauts' spacecraft cannot be adequately shielded from the high energy particles of cosmic rays.

One technique for detecting neutrons (and neutron radiation) uses a boron-10 loaded detector to capture neutrons. The boron-10 detector has a complex composition that results in a variety of signals being generated and requires significant computational resources to distinguish the neutron captures from other signals generated by other high energy particles. Thus, a neutron spectrometer that can more easily and efficiently identify neutron captures and determine an amount of neutron radiation exposure would be beneficial.

SUMMARY

The present application generally pertains to a neutron spectrometer that can distinguish neutron capture events from other types of radiation in order to clearly identify a person's exposure due to neutrons in a radiation environment that contains other forms of radiation (e.g., a mixed radiation environment). The neutron spectrometer can include a neutron detector that can capture neutrons and a controller that determine the energy associated with the captured neutrons, which energy would correspond to a person's exposure to neutron radiation. The neutron detector can include scintillating glass fibers embedded in a plastic scintillator. A photomultiplier tube can be positioned on each end of the detector to detect light pulses generated by both the scintillating glass fibers and the plastic scintillator. A controller can analyze the detected light pulses to determine when a neutron is captured and the energy associated with the neutron capture event. More specifically, the controller can identify a unique light pulse associated with a neutron capture event and use the total light previously produced in the event as a measure of primary neutron energy deposited in the detector volume.

During operation of the detector, a neutron can enter the detector and lose energy in the plastic scintillator thereby generating a light pulse. The intensity of the light pulse produced in the plastic scintillator (and detected by the photomultiplier tubes) is used to determine the neutron's energy (after a neutron capture event is determined to have occurred). After the neutron slows down in the plastic scintillator, the neutron can be captured by lithium in the glass fiber, causing the lithium to promptly decay into a triton and alpha particle. The triton and alpha particles generate a light pulse in the glass fiber that is detected by the photomultiplier tubes. The light pulses generated in the glass fibers can be nearly the same for all neutron captures and the lithium in the glass fiber has only a small probability of responding to other forms of radiation (or high energy particles).

The composite scintillator (i.e., the plastic scintillator and the scintillating glass fibers) in the detector can be optimized based on the differing optical characteristics of the plastic scintillator and the scintillating glass fibers to assure that the light pulses from the glass fibers are distinct with respect to the light pulses from the plastic scintillator (whether the light pulse is generated from a neutron or other high energy particle). The photomultiplier tubes can generate scintillation signals in response to the detection of the light pulses from the plastic scintillator and the scintillating glass fibers. The scintillation signals from the photomultiplier tubes can be digitized, recorded and temporarily stored until a controller analyzes the signal amplitude and timing of the scintillation signals to determine whether the scintillation signal indicates a neutron capture event or some other form of radiation. Events that meet the neutron trigger criteria are saved for further analysis and those that do not meet the neutron trigger criteria are eliminated.

The measurement of the neutrons can be accomplished by analyzing the scintillation signals generated from neutrons within the composite scintillator to distinguish plastic scintillation signals (i.e., scintillation signals based on light pulses from the neutrons interacting with the plastic scintillator) from glass fiber scintillation signals (i.e., scintillation signals based on light pulses from the neutrons being captured in the scintillating glass fibers). The controller can then decide if any pair of scintillation signals corresponds to the interaction (or moderation) of a neutron within the plastic scintillator followed by a neutron capture within the glass fibers.

One advantage of the present application is that it can distinguish neutron events from other types of radiation.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
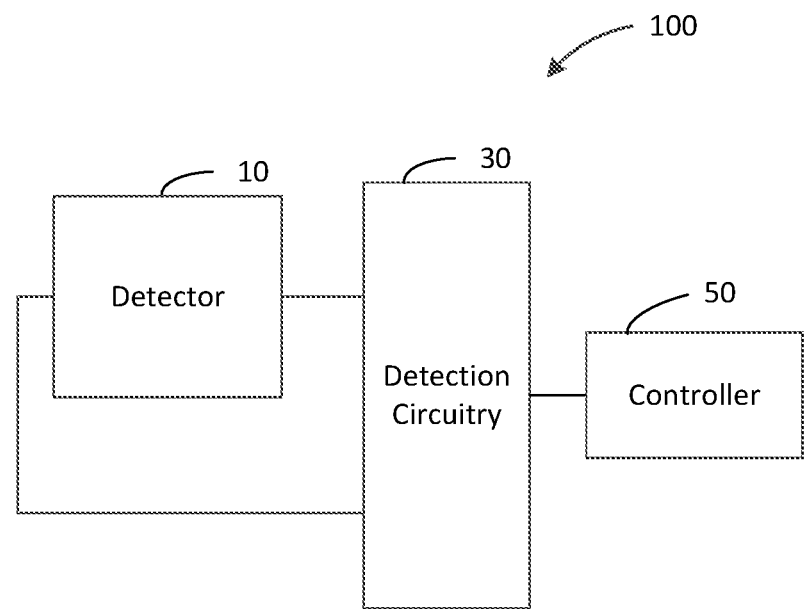
FIG. 1 is a block diagram of an embodiment of a neutron spectrometer system.

FIG. 1 shows an embodiment of a neutron spectrometer system 100. The neutron spectrometer system 100 can include a detector 10, detection circuitry 30 coupled to the detector 10 and a controller 50 coupled to the detection circuitry 30. The detector 10 can generate signals indicating the impingement of high energy particles (e.g., neutrons, gamma particles, etc.) on the detector 10. The detection circuitry 30 can evaluate the signals from the detector 10 and determine when a neutron capture event has occurred. When the detection circuitry 30 indicates that a neutron capture event has occurred, the controller 50 can determine the corresponding energy from neutrons impinging on the detector 10 based on the signals associated with the neutron capture event.

Figure 2:
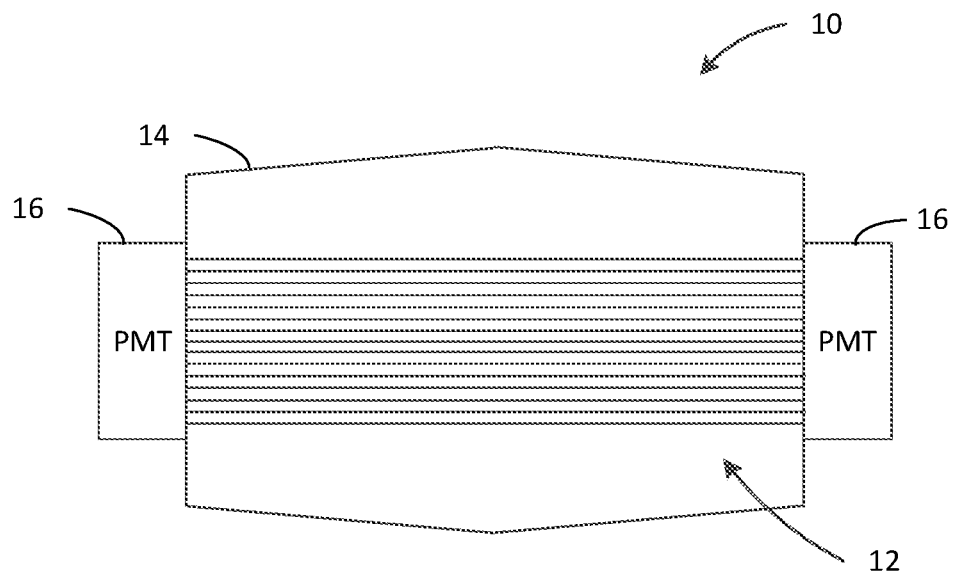
FIG. 2 is an embodiment of a neutron detector of the neutron spectrometer system of FIG. 1.

FIG. 2 shows an embodiment of the detector 10 of the system 100. The detector 10 can include a plurality of scintillating glass fibers 12 embedded in a plastic scintillator 14. A photomultiplier tube (PMT) 16 can be positioned on each end of detector 10 to detect light pulses generated by the plastic scintillator 14 and the glass fibers 12. In one embodiment, the plastic scintillator 14 may be polyvinyltoluene (PVT), but other scintillating materials can be used in other embodiments. In another embodiment, the plastic scintillator 14 can be wrapped with polytetrafluoroethylene (e.g., Teflon®).

In an embodiment, the detector 10 can include about 5200 glass fibers embedded in the plastic scintillator 14 such that each glass fiber 12 is surrounded by the plastic scintillator 14. However, in other embodiments, more or less than 5200 glass fibers 12 may be embedded in the plastic scintillator 14. In an embodiment, the glass fibers 12 can be arranged within the plastic scintillator 14 in a predetermined pattern, such as a matrix, with a predetermined spacing between glass fibers 12. For example, the glass fibers 12 may be arranged in a 72×72 matrix with a 1 mm (millimeter) step between fibers. However, in other embodiments, the glass fibers 12 may be randomly placed in the plastic scintillator 14 or may be placed in the plastic scintillator 14 in accordance with multiple patterns (e.g., a first pattern near the edge of the plastic scintillator 14 and a second pattern at the interior of the plastic scintillator 14).

Each of the glass fibers 12 can have a diameter between about 100 microns and about 120 microns, but may have greater or lesser diameters in other embodiments. In an embodiment, the 100-120 micron range for the glass fibers 12, enables the controller 50 to distinguish neutron capture events from gamma particle events that may interact with the glass fibers 12. The size of the glass fibers 12 limits the light pulse that can be generated by a gamma particle in the glass fibers 12, thereby resulting in a scintillation signal that has a different shape (e.g., a smaller amplitude and smaller signal width) from the scintillation signals generated by neutron captures in the glass fibers 12.

In addition, each of the glass fibers 12 can be doped with lithium-6 to capture neutrons that have impinged on the plastic scintillator 14. The glass fibers 12 can have different scintillation characteristics in terms of spectral output and timing from the scintillation characteristics of the plastic scintillator 14. In one embodiment, the glass fibers 12 may be composed of: about 20% $Li_2O$; about 15% MgO; about 64.4% of $SiO_2$; and about 0.6% of $Ce_2O_3$, with the lithium being about 95% $^6Li$. Equation 1 can represent the capture interaction between the neutrons (n in Equation 1) and the lithium-6 in the glass fibers ($^6Li$ in Equation 1) as follows:

$$n + {}^6Li \rightarrow \alpha + triton \quad (1)$$

where the triton energy is 2.734 MeV and the α energy is 2.105 MeV.

In an embodiment, the capture interaction between the neutrons and the lithium-6 in the glass fibers 12 can occur when the neutrons have lost most of their kinetic energy through elastic scattering in the plastic scintillator 14 and are near a thermal energy level (e.g., $10^{-8}$ eV). In the plastic scintillator 14, most of the energy lost by the neutron results from the elastic scattering of recoil protons off of hydrogen atoms (or less frequently carbon atoms) in the plastic scintillator 14. The recoil protons (or ions) produced from the elastic scattering interact, deposit their energy and generate photons.

The PMTs 16 can count the photons in the light pulses produced by scintillation in both the plastic scintillator 14 and the glass fibers 12 as the charged secondary particles (e.g., recoil protons, alpha particles, tritons, etc.) deposit energy in the plastic scintillator 14 and the glass fibers 12. The photons are created when the primary neutrons undergo elastic and inelastic scatter (in the plastic scintillator 14) and neutron capture (in the glass fibers 12). In an embodiment, a photon can be generated for each 10 keV of energy.

Figure 3:
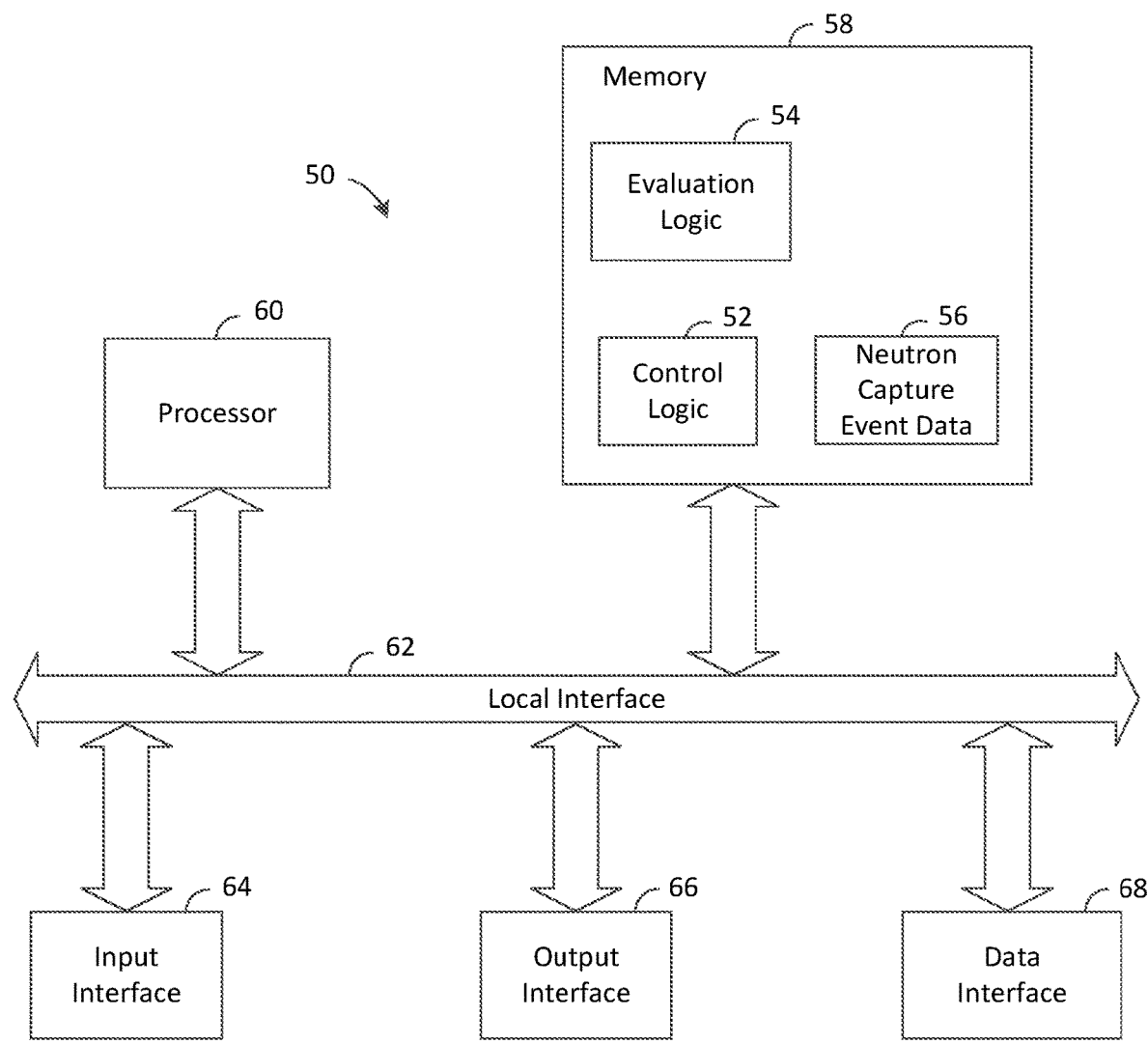
FIG. 3 is a block diagram of an embodiment of the controller of the neutron spectrometer system of FIG. 1.

FIG. 3 shows an embodiment of the controller 50 of the system 100. The controller 50 may include logic 52, referred to herein as "control logic," for generally controlling the operation of the controller 50 and may also be used to control various operations of components of the system 100. The controller 50 also includes evaluation logic 54 to process the neutron capture event data 56 and determine the corresponding energy of the neutrons impacting the detector 10. The control logic 52 and the evaluation logic 54 can be implemented in software, hardware, firmware or any combination thereof. In the controller 50 shown in FIG. 3, the control logic 52 and the evaluation logic 54 are implemented in software and stored in memory 58 of the controller 50. Note that the control logic 52 and the evaluation logic 54, when implemented in software, can be stored and transported on any non-transitory computer-readable medium for use by or in connection with an instruction execution apparatus (e.g., a microprocessor) that can fetch and execute instructions. In the context of this application, a "computer-readable medium" can be any device, system or technique that can contain or store a computer program for use by or in connection with an instruction execution apparatus. The controller 50 may be implemented as a combination of hardware and software, such as at least one microprocessor or other type of processor programmed with instructions for performing various functions. Other configurations of the controller 50 are possible in other embodiments. As an example, the controller 50 may be implemented as a field programmable gate array (FPGA) or other type hardware as may be desired.

The controller 50 shown in FIG. 3 includes at least one conventional processor 60, which has processing hardware for executing instructions stored in memory 58. As an example, the processor 60 may include a digital signal processor or a central processing unit (CPU). The processor 60 communicates to and drives the other elements within the controller 50 via a local interface 62, which can include at least one bus. Furthermore, an input interface 64, for example, a keyboard, a mouse, touchscreen, sensor or any other interface device or apparatus, can be used to input data from a user of the controller 50, an output interface 66, for example, a printer, monitor, liquid crystal display (LCD), or other display apparatus, can be used to output data to the user of the controller 50, and a data interface 58 permits the controller 50 to receive data from or communicate data to the detection circuitry 30 or other components of the system 100 as may be desired.

Figure 4:
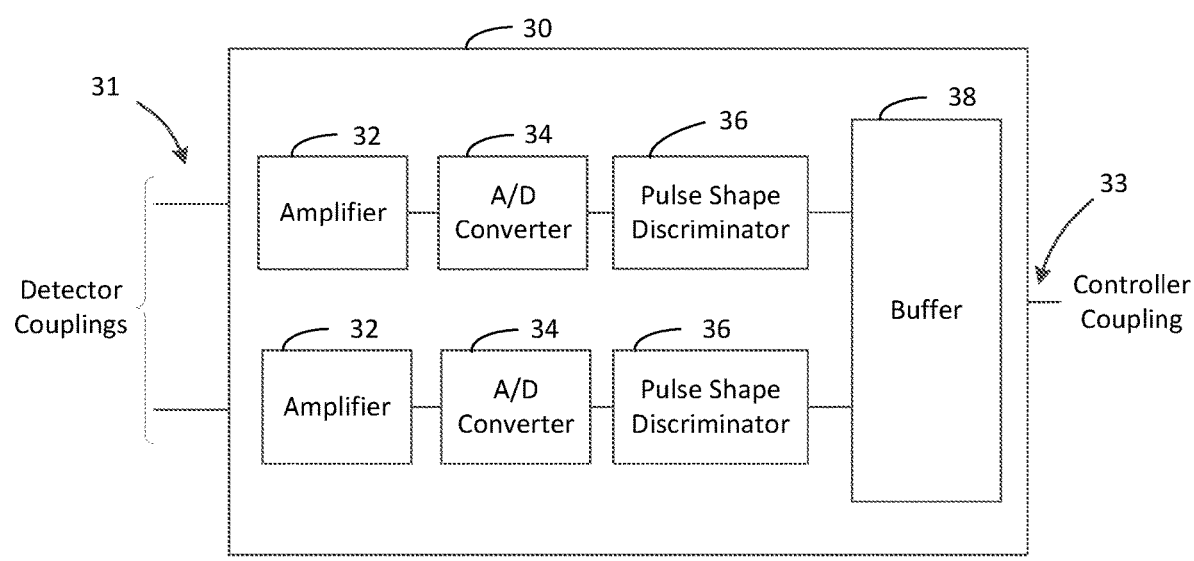
FIG. 4 is a block diagram of an embodiment of detection circuitry of the neutron spectrometer system of FIG. 1.

FIG. 4 shows an embodiment of the detection circuitry 30. The detection circuitry 30 can receive the scintillation signals from the PMTs 16 of the detector 10 via the detector couplings 31. In one embodiment, the detection circuitry 30 can include individual processing paths for the scintillation signals from the PMTs 16. In other words, the scintillation signals from one PMT 16 are processed on one path and the scintillation signals from the other PMT 16 are processed on a second path that can be separate from the first path. However, in other embodiments, the signals from the PMTs 16 can be processed with a common processing path (i.e., a single processing path).

As shown in FIG. 4, the processing paths for the signals from the PMTs 16 can include an amplifier 32, an A/D (analog to digital) converter 34 and a pulse shape discriminator 36. The amplifier 32 can be used to increase the amplitude of the scintillation signal from the PMT 16 in accordance with a predetermined gain. The A/D converter 34 can be used to convert the amplified signal to a digital signal and the pulse shape discriminator 36 can be used to detect a neutron capture trigger event, and remove noise and unwanted signals (e.g., signals generated by other high energy particles such as gamma particles). The pulse shape discriminator 36 can be used to look for a predetermined pulse shape (e.g., a pulse that has a predetermined amplitude and pulse width) that is indicative of neutron capture event.

The output of each of the processing paths can be coupled to a buffer 38 which can temporarily store the processed signals from the processing paths. In one embodiment, the buffer 38 can be a ring buffer, but, in other embodiments, the buffer 38 can be any type of buffer having a first-in-first-out (FIFO) data characteristic. In an embodiment, the buffer 38 can store processed signals from the processing paths for about 160 μs (microseconds), but may store processed signals for shorter or longer time periods in other embodiments. The contents of the buffer 38 can be provided to the controller 50 via the controller coupling 33 in response to a determination from the pulse shape discriminator 36 that a neutron capture trigger event has occurred.

In one embodiment, some or all of the components or functionality of the detection circuitry 30 may be incorporated into the controller 50. For example, the detection of the predetermined pulse shape may be performed by the controller 50 instead of the pulse shape discriminator 36. In another example, buffer 38 may be incorporated in memory 58 of controller 50. In another embodiment, the detection circuitry 30 shown in FIG. 4 may include additional components (e.g., signal filters) and/or may omit certain components as desired. For example, the signals from the PMTs 16 may be provided directly to the A/D converters 34 without being amplified. In other words, the detection circuitry 30 may not include amplifiers 32.

Figure 5:
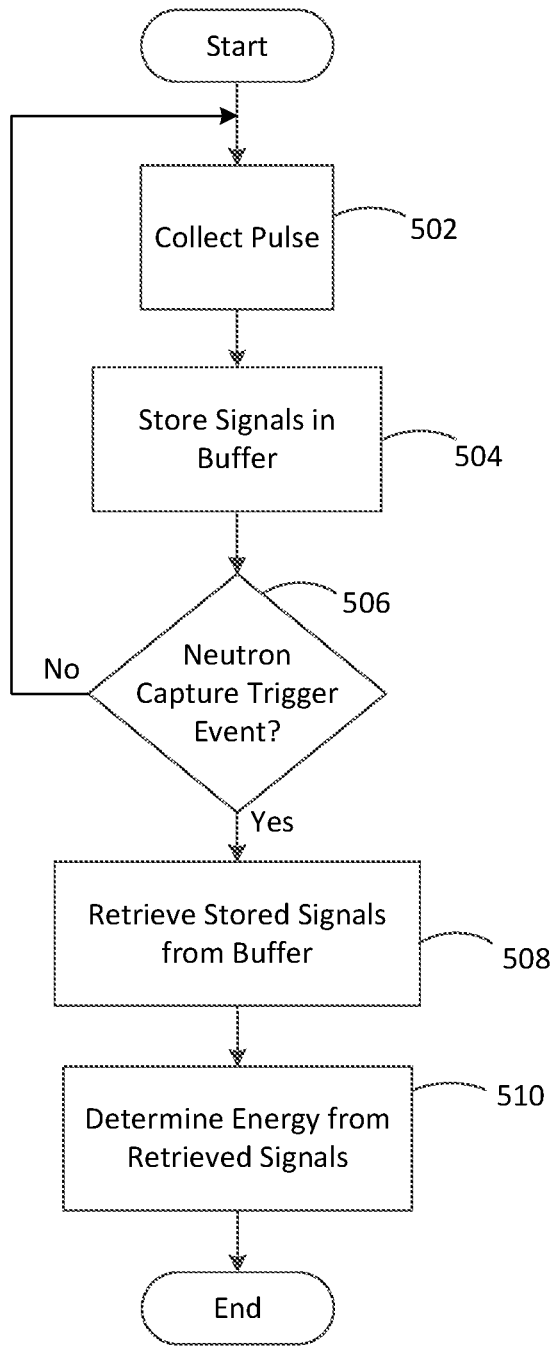
FIG. 5 is a flow diagram showing an embodiment of a process for determining the energy collected by the neutron spectrometer system.

FIG. 5 is a flow chart showing an embodiment of a process for determining the energy associated with neutrons impinging on the detector 10. The controller 50 can determine the neutron energy based on the signals retrieved from the buffer 38 when a neutron capture trigger event occurs. The process begins with the PMTs 16 collecting the light pulses (generated from photons) in the plastic scintillator 14 and the glass fibers 12 (step 502). The PMTs 16 can then convert the collected light pulses into scintillation signals that are then provided to detection circuitry 30. The detection circuitry 30 can then process the signals and store the signals in buffer 38 (step 504). In one embodiment, the pulse shape discriminators 36 may discard received scintillation signals that are below are predetermined threshold amplitude (see e.g., line TH in FIG. 6)

Figure 6:
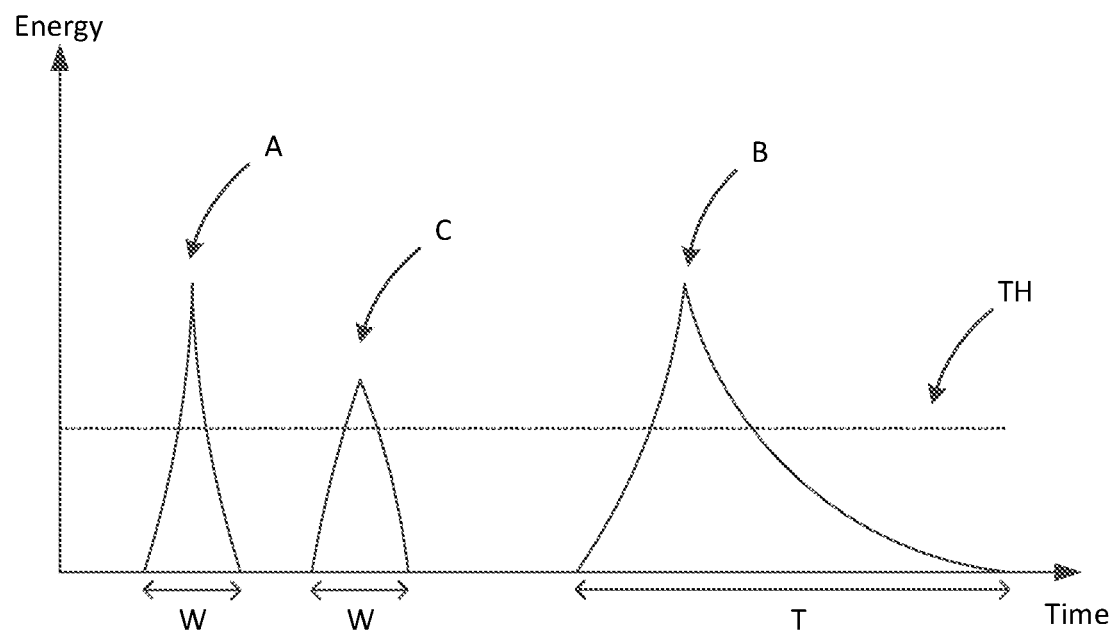
FIG. 6 is a graph showing an embodiment of collected signals used to identify a trigger event.

Based on the scintillation signals from the PMTs 16, a determination is made by the detection circuitry 30 as to whether a neutron capture trigger event has occurred (step 506). If a neutron capture trigger event has not occurred, the process returns to step 502 to have the PMTs 16 collect additional pulses. A neutron capture trigger event can be determined to occur based on the receipt of a scintillation signal having a predetermined shape (e.g., a predetermined amplitude and predetermined pulse width). As shown in FIG. 6, the graph indicates the receipt of three signals. Signal A in FIG. 6 has a width W and corresponds to a scintillation signal resulting from the collection of light pulses from neutrons interacting with the plastic scintillator 14. Signal B in FIG. 6 has a width T and corresponds to a scintillation signal resulting from the collection of light pulses from a neutron being captured by the glass fibers. In one embodiment, the width W can be about 10 ns (nanoseconds), while width T can be about 50 ns, but both width W and width T may have other durations in other embodiments. The unique shape of signal B (e.g., the signal having a width T and an amplitude greater than a threshold (represented by line TH in FIG. 6)) resulting from the capture of a neutron by the lithium-6 in the glass fibers can be used as the predetermined shape to determine if a neutron capture trigger event has occurred. In one embodiment, signal B may be asymmetrical and may have an extended "tail" portion, as shown in FIG. 6, that forms part of the width T. In other words, when a scintillation signal having a shape corresponding to the shape of signal B is detected, a neutron capture trigger event is determined to have occurred.

If a neutron capture trigger event is determined to have occurred, the signals stored in buffer 38 are retrieved by the controller 50 (step 508) and the buffer 38 is cleared (e.g., all stored signal data is removed (or deleted) from the buffer 38). In an embodiment, the buffer 38 may include one scintillation signal corresponding to signal A and one scintillation signal corresponding to signal B (the neutron capture trigger event), but may include additional scintillation signals corresponding to signal A or no scintillation signals corresponding to signal A in other embodiments. The controller 50 can then use the signals stored in buffer 38 to determine the neutron energy impacting the detector 10 (step 510). In one embodiment, the controller 50 can evaluate the signals from the buffer 38 to identify signals corresponding to signal A from FIG. 6 and then use the information from the identified signals (e.g., the amplitude of the signal) to determine the corresponding energy from neutrons impinging the detector 10. When determining the neutron energy associated with a neutron capture, the controller 50 can discard stored signal information from signals that are not associated with the interaction and collection of neutrons by the detector 10. For example, signal C in FIG. 6 may correspond to a scintillation signal from light pulses generated by another high energy particle (e.g., a gamma particle). Since signal C does not have the same amplitude as signals A and B (which are associated with scintillation signals generated from neutrons), the controller 50 can use the difference in amplitude between signals A (and B) and C (even though signals A and C have the same width) to determine that signal C was not generated from a neutron and should not be used to determine the neutron energy.

In another embodiment, the detector 10 may only use a single PMT 16 to detect light pulses generated by the plastic scintillator 14 and the scintillating glass fibers 12. The scintillation signals from the PMT 16 can then be split into two (or more) channels for subsequent processing of the scintillation signals as described above. In an embodiment, the scintillation signals from the neutron scattering in the plastic scintillator 14 and the neutron captures in the scintillating glass fibers 12 may have different predetermined shapes (e.g., higher amplitudes) when a single PMT 16 is used.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A neutron spectrometer comprising:
   a detector comprising:
   a plastic scintillator configured to generate first light pulses in response to particles interacting with the plastic scintillator, wherein the particles include neutrons;
   a plurality of scintillating glass fibers embedded in the plastic scintillator, each scintillating glass fiber of the plurality of scintillating glass fibers comprising lithium, and wherein the plurality of scintillating glass fibers are configured to generate second light pulses different from the first light pulses in response to the particles interacting with the plurality of glass fibers; and
   a pair of photomultiplier tubes positioned on the plastic scintillator at opposed ends of the detector to detect the first light pulses generated by the plastic scintillator and the second light pulses generated by the plurality of scintillating glass fibers, the pair of photomultiplier tubes configured to generate first scintillation signals corresponding to the first light pulses and second scintillation signals corresponding to the second light pulses;
   detection circuitry coupled to the pair of photomultiplier tubes to receive the first scintillation signals and the second scintillation signals from the pair of photomultiplier tubes, the detection circuitry comprising:
   a buffer configured to store the received first scintillation signals and the received second scintillation signals;
   at least one pulse shape discriminator configured to analyze the received first scintillation signals and the received second scintillation signals to determine whether a neutron capture event has occurred, a neutron capture event is determined to occur in response to one of the received second scintillation signals having a predetermined amplitude and a predetermined width, wherein the predetermined width is greater than a width of a first scintillation signal resulting from a neutron interaction with the plastic scintillator; and
   a controller coupled to the detection circuitry to receive the stored first scintillation signals and the stored second scintillation signals in the buffer in response to the at least one pulse shape discriminator determining that a neutron capture event has occurred, the controller configured to determine an amount of energy associated with neutrons impinging the detector based on an amplitude of one or more stored first scintillation signals corresponding to a neutron interaction with the plastic scintillator.

2. The neutron spectrometer of claim 1, wherein the plurality of glass fibers each have a diameter between about 100 microns and about 120 microns.

3. The neutron spectrometer of claim 2, wherein the diameter of each glass fiber of the plurality of glass fibers is 100 microns.

4. The neutron spectrometer of claim 1, wherein the lithium in the plurality of glass fibers is lithium-6.

5. The neutron spectrometer of claim 1, wherein the buffer comprises a ring buffer.

6. The neutron spectrometer of claim 5, wherein the ring buffer stores first scintillation signals and second scintillation signals for a period of about 160 microseconds.

7. The neutron spectrometer of claim 1, wherein the controller is configured to delete the stored first scintillation signals and the stored second scintillation signals in the buffer after receiving the stored first scintillation signals and the stored second scintillation signals.

8. The neutron spectrometer of claim 1, wherein the detection circuitry further comprises an analog to digital converter to convert the received first scintillation signals and the received second scintillation signals to a digital form prior to storing the first scintillation signals and the second scintillation signals in the buffer.

9. The neutron spectrometer of claim 1, wherein the predetermined width is about 5 times greater than the width of a first scintillation signal resulting from a neutron interaction with the plastic scintillator.

10. The neutron spectrometer of claim 1, wherein the predetermined width corresponds to about 50 nanoseconds.

11. The neutron spectrometer of claim 1, wherein the particles further include gamma particles and the at least one pulse shape discriminator and the controller are configured to discard first scintillation signals and second scintillation signals resulting from gamma particles interacting with the plastic scintillator and the plurality of scintillating glass fibers.

12. A method of determining an amount of energy associated with neutrons, the method comprising:
   generating, in a plastic scintillator of a detector, first light pulses in response to particles interacting with the plastic scintillator, wherein the particles include neutrons;
   generating, in a plurality of scintillating glass fibers embedded in the plastic scintillator, second light pulses different from the first light pulses in response to particles interacting with the plurality of scintillating glass fibers, and each scintillating glass fiber of the plurality of scintillating glass fibers comprising lithium;
   detecting, by a pair of photomultiplier tubes positioned at opposed ends of the plastic scintillator, the first light pulses generated by the plastic scintillator and the second light pulses generated by the plurality of scintillating glass fibers;

generating, by the pair of photomultiplier tubes, first scintillation signals corresponding to the first light pulses and second scintillation signals corresponding to the second light pulses storing, by a buffer, the first scintillation signals and the second scintillation signals;

analyzing, by at least one pulse shape discriminator, the first scintillation signals and the second scintillation signals to determine whether a neutron capture event has occurred, a neutron capture event is determined to occur in response to one of the second scintillation signals having a predetermined amplitude and a predetermined width, wherein the predetermined width is greater than a width of a first scintillation signal resulting from a neutron interaction with the plastic scintillator;

receiving, by a controller, the stored first scintillation signals and the stored second scintillation signals in the buffer in response to the at least one pulse shape discriminator determining that a neutron capture event has occurred; and determining, by the controller, an amount of energy associated with neutrons impinging the detector based on an amplitude of one or more stored first scintillation signals corresponding to a neutron interaction with the plastic scintillator.

13. The method of claim 12, wherein the particles further include gamma particles and the method further comprising discarding first scintillation signals and second scintillation signals resulting from gamma particles interacting with the plastic scintillator and the plurality of scintillating glass fibers.

14. The method of claim 12, wherein the diameter of each glass fiber of the plurality of glass fibers is 100 microns.

15. The method of claim 12, wherein the lithium in the plurality of glass fibers is lithium-6.

16. The method of claim 12, wherein the buffer comprises a ring buffer configured to store first scintillation signals and second scintillation signals for a period of about 160 microseconds.

17. The method of claim 12, wherein the predetermined width corresponds to about 50 nanoseconds.

18. The method of claim 12, wherein the predetermined width is about 5 times greater than the width of a first scintillation signal resulting from a neutron interaction with the plastic scintillator.

* * * * *